Dec. 18, 1928.
W. I. WHEELER
1,695,356
TRANSMISSION MECHANISM
Filed July 26, 1927 4 Sheets-Sheet 1
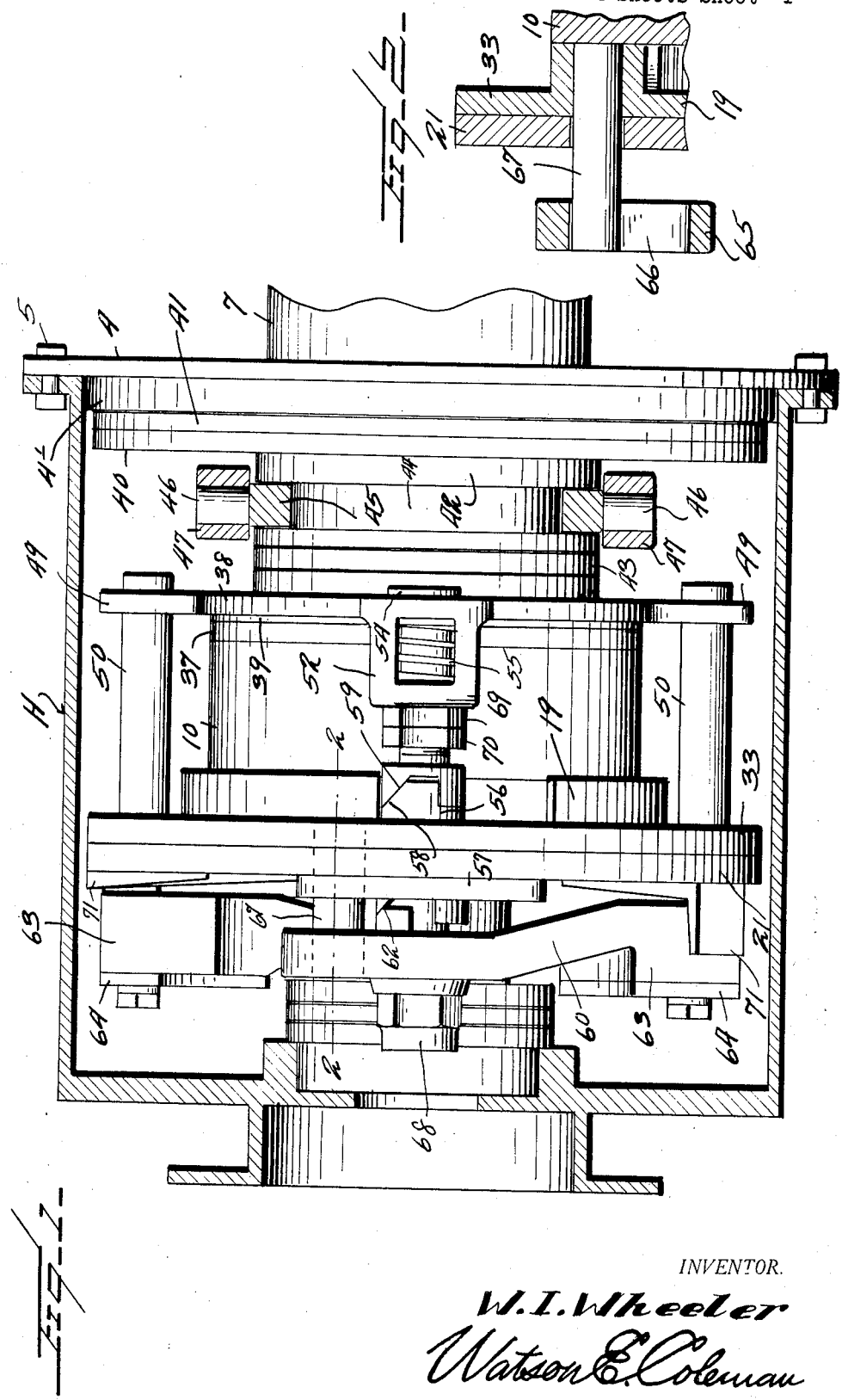
INVENTOR.
W. I. Wheeler
Watson E. Coleman
ATTORNEY.

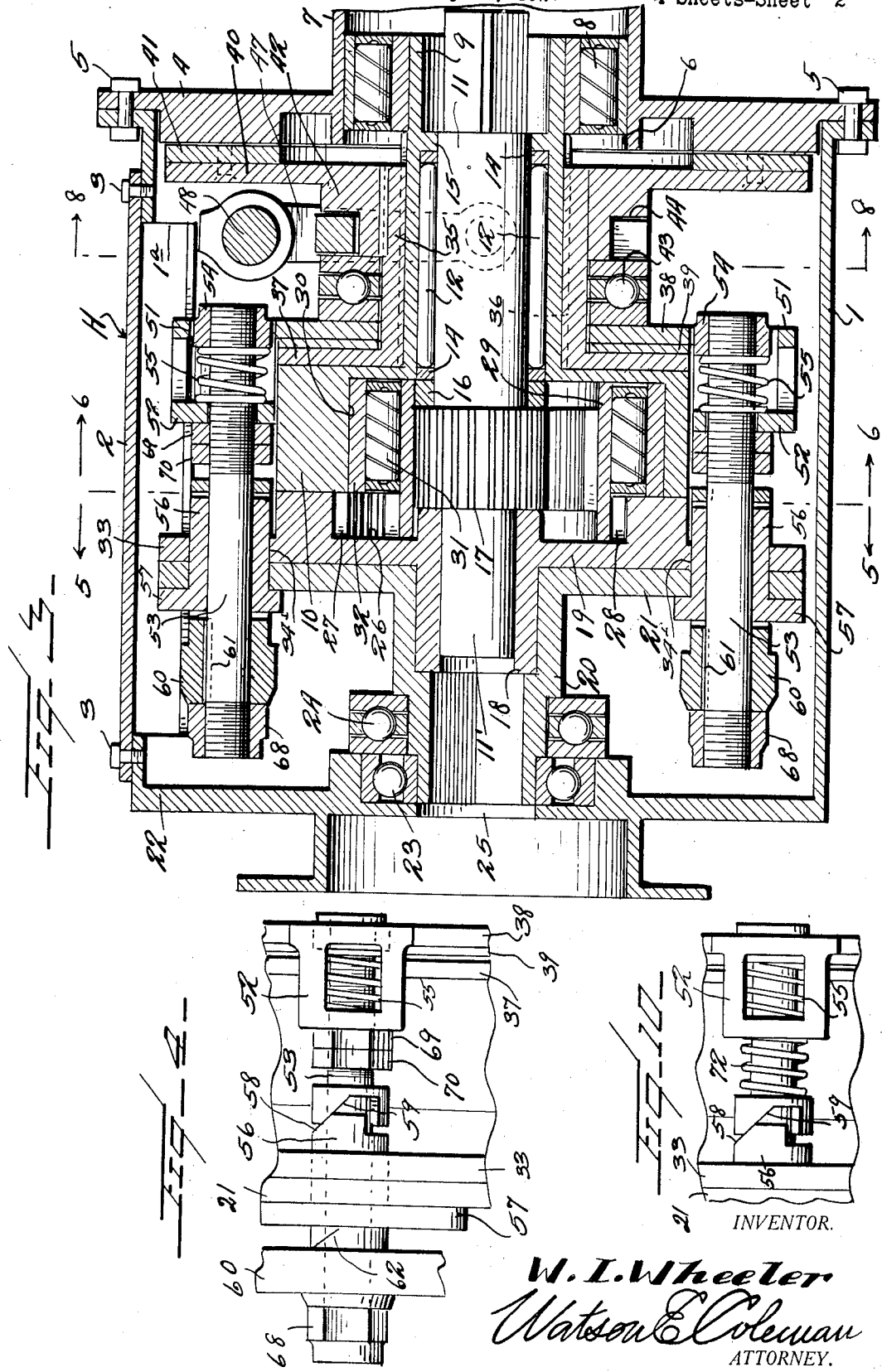

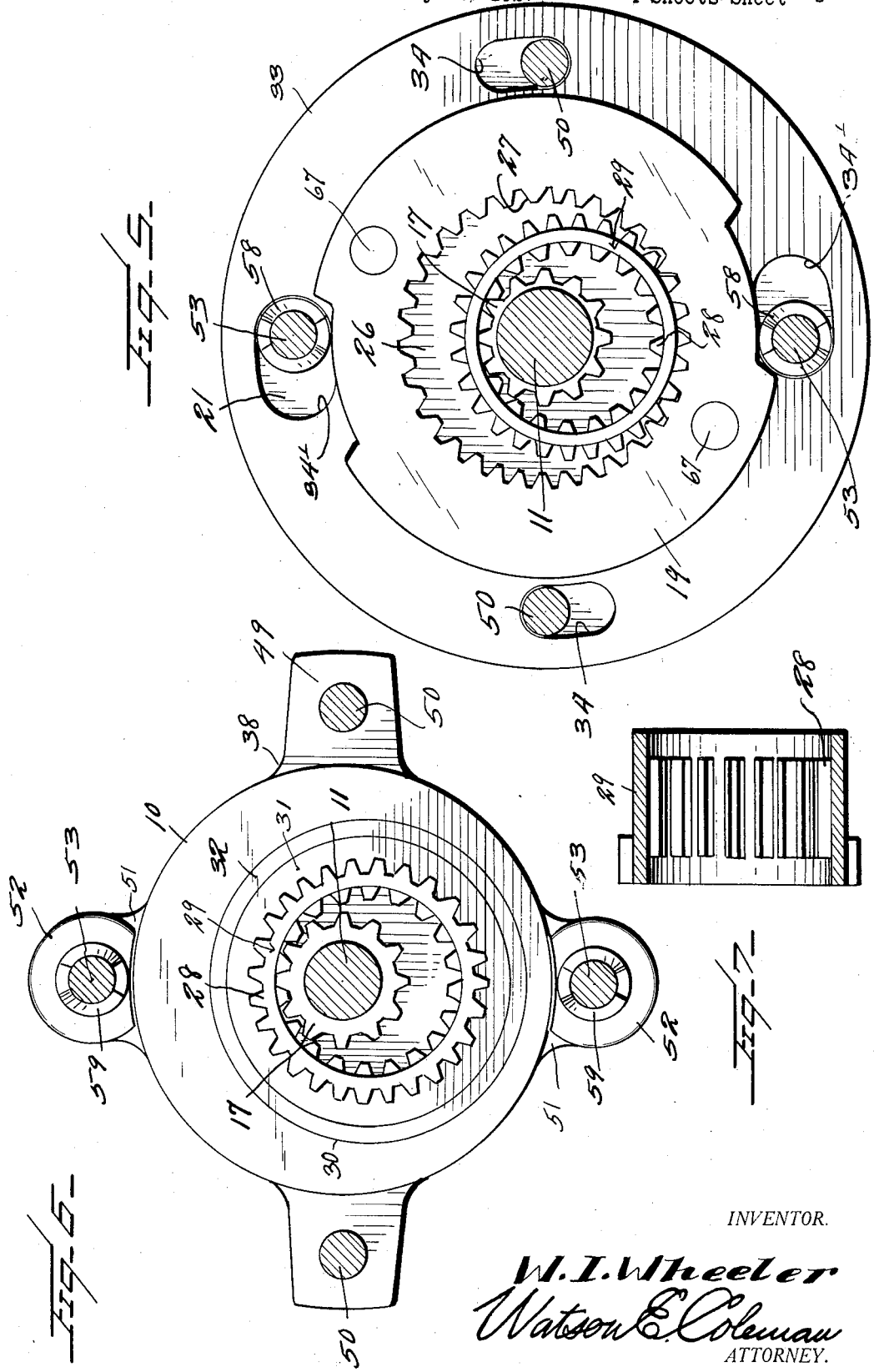

Dec. 18, 1928. 1,695,356
W. I. WHEELER
TRANSMISSION MECHANISM
Filed July 26, 1927 4 Sheets-Sheet 4
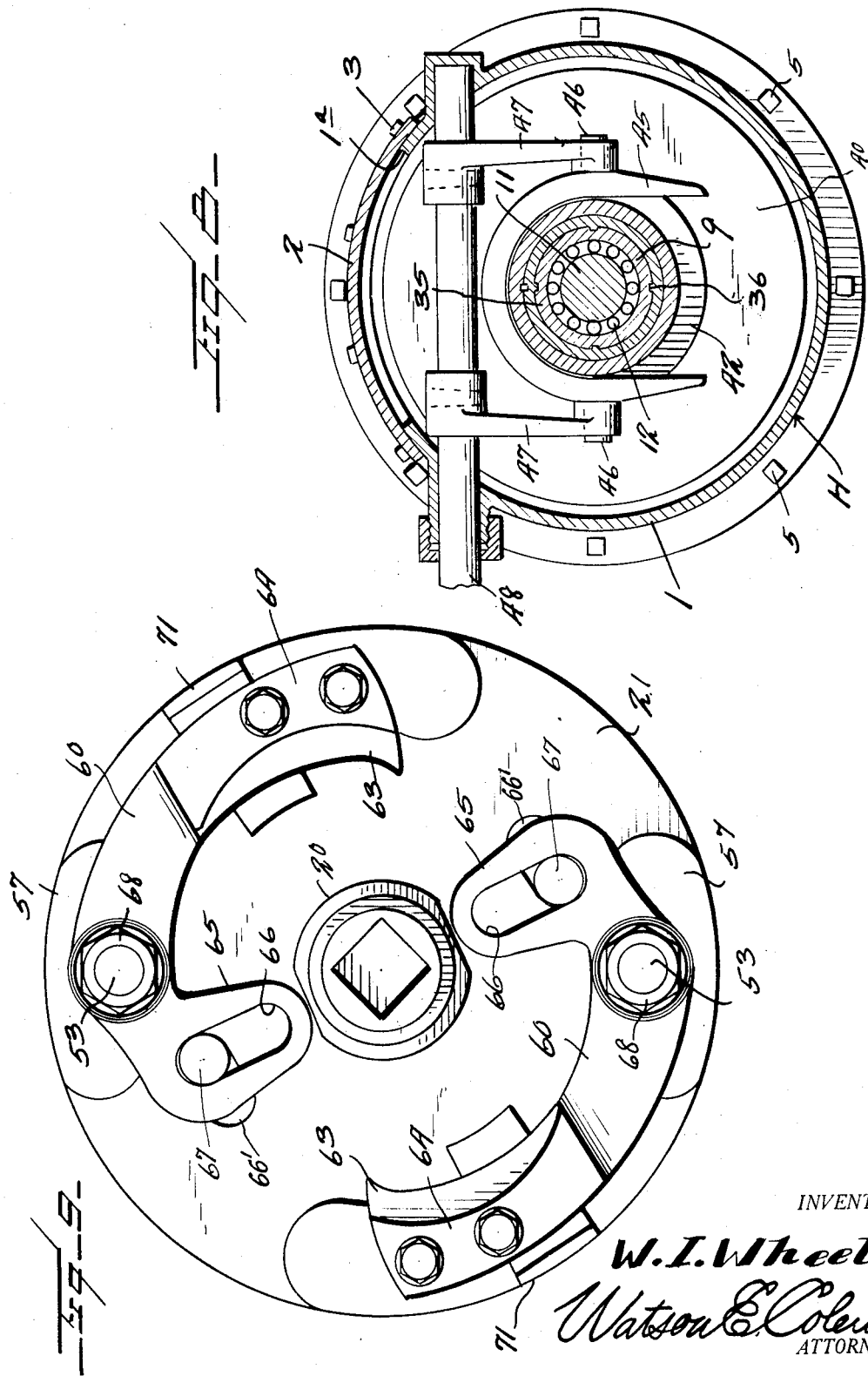
INVENTOR.
W. I. Wheeler
Watson E. Coleman
ATTORNEY.

Patented Dec. 18, 1928.

1,695,356

UNITED STATES PATENT OFFICE.

WILLIAM I. WHEELER, OF SCOTTVILLE, ILLINOIS.

TRANSMISSION MECHANISM.

Application filed July 26, 1927. Serial No. 208,621.

This invention relates to power transmission mechanism and the object of the invention is to provide a mechanism of this kind which operates automatically to increase or decrease speed of a driven member without the necessity of shifting gears from one driving relation to another comprising a prime mover and a driven element together with constantly meshing gears operatively connecting the prime mover and the driven element, one of said gears being associated with a mechanism bodily shiftable along the prime mover into or out of braking position to effect the desired variance in the driving relation between the prime mover and the driven element, together with means for effecting automatically such bodily shifting movement under the influence of the speed of the prime mover, and wherein means are provided operable at will independently of the automatic means for moving said bodily shiftable mechanism as desired.

The invention consists in the details of construction and in the combination and arrangement of the several parts of my improved power transmission mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view partly in section and partly in elevation illustrating the power transmission mechanism constructed in accordance with an embodiment of my invention;

Figure 2 is a fragmentary detailed sectional view taken substantially on the line 2—2 of Figure 1;

Figure 3 is a sectional view taken radially through the structure illustrated in Figure 1 with certain of the parts in elevation;

Figure 4 is a fragmentary view in plan of one of the cammed shanks as herein employed in the second position from that illustrated in Figure 3;

Figure 5 is a sectional view taken substantially on the line 5—5 of Figure 3 looking in the direction indicated by the arrows;

Figure 6 is a sectional view taken substantially on the line 6—6 of Figure 3 looking in the direction of the arrows;

Figure 7 is a sectional view taken radially through the intermediate gear comprised in the assembly as herein embodied;

Figure 8 is a sectional view taken substantially on the line 8—8 of Figure 3 looking in the direction of the arrows;

Figure 9 is a view in elevation of the driven member as herein disclosed together with certain of the parts concomitant therewith;

Figure 10 is a fragmentary view illustrating the slightly modified form of construction.

As disclosed in the accompanying drawings, H denotes a housing of requisite configuration and dimensions and which is adapted to be supported in applied or working position in any desired manner and in a way to hold the same against rotation. The peripherial wall 1 of the housing H preferably in the upper portion thereof is provided with an inspection opening 1ª of desired dimensions and which is normally closed by a plate 2 held in applied position with respect to the housing H proper by the stud bolts 3 or otherwise as may be preferred.

In the present embodiment of my invention, the forward end of the housing H is closed by a removable head 4 bolted as at 5 or otherwise fixedly attached to the housing H. This head 4 has its intermediate portion extending or projecting a slight distance within the adjacent end of the housing H, as indicated at 4' in Figures 1 and 3. This portion 4' constitutes a braking element, the purpose of which will be hereinafter more particularly referred to.

At substantially its axial center, the head 4 is provided therethrough with an opening 6 of requisite diameter which is defined by an outstanding sleeve or boss 7. Mounted within this sleeve or boss 7 and opening 5 is a conventional roller bearing assembly 8 which provides a bearing for an end portion of an elongated tubular member or hub 9 extending axially and concentrically of a disk 10. Disposed through the hub 9 and the disk 19 is a drive shaft 11, the outer or forward end portion being adapted to be coupled in any desired manner with the required source of power. Between the shaft 11 and the hub 9 are the roller bearings 12 interposed between the thrust washers 14. One of the washers 14 abuts an inwardly disposed flange 15 provided within the hub 9 and suitably positioned therein with respect to the outer end thereof, while the second washer 14 abuts a spacing washer 16 surrounding the shaft 11 and abutting the pinion 17 preferably integral with the shaft 11.

That end portion 11' of the shaft within the housing H and beyond the pinion 17 is snugly received within the hub 18 and carried by a second disk 19. The hub 18 is freely engaged on the shaft portion 11' whereby the disk 19 may rotate therearound. The disks 10 and 19 are adapted to have clutching contact one with the other and particularly when the driven member to be hereinafter referred to is rotating at high speed. The hub 18 is snugly received within the end portion of the rearwardly directed hub 20 carried at the axial center of the plate 21. The outer portion of the hub 20 is rotatably supported by the rear head 22 of the housing H in connection with the bearing assemblies 23 and 24; the assembly 24 constituting a thrust bearing. The head 22 of the housing H is provided with a suitable opening 25 to permit a propeller or other transmitting shaft to be operatively engaged with the hub 20 for rotation therewith. The inner face of the disk 19 at its central portion is cut out as at 26 and the peripherial wall of such cut out portion constitutes an internal gear 27 which is constantly in mesh with the intermediate gear 28. This gear 28 is of a compound type with its external teeth in mesh with the internal gear 27 while the internal teeth thereof are constantly in mesh with the pinion 17 hereinbefore referred to. The intermediate gear 28 is arranged at the end portion of the sleeve 29 which extends within a central cut out portion 30 provided in the rear face of the disk 10 and eccentric to the shaft 11 and also eccentric to the axial center of the disk 10. The portion of the sleeve within the cut out portion 30 of the disk snugly engages within a roller gear assembly 31, said assembly having associated therewith an encircling sleeve 32 snugly engaged within said cut out portion 30.

Through the instrumentality of the intermediate gear 28, the pinion 17 carried by the shaft 11 and the internal gear 27 which is comprised in the driven element are constantly in mesh resulting, however, in the driven element being rotated at a reduced speed when the disk 10 is held against rotation within the housing H and, of course, the disks 10 and 19 are out of clutching engagement. The disk 19 is defined by an outstanding peripherial flange 33 provided at equally distantly spaced points with the circumferentially disposed slots 34 and 34', said slots 34 being alternately arranged with respect to the slots 34' as herein embodied.

Surrounding the portion of the hub 9 within the housing H is a sleeve 35 keyed as at 36 for rotation with the hub 9, but capable of independent shifting movement lengthwise thereof. The inner or rear end portion of the sleeve 35 is defined by an outstanding flange 37 for contact with the forward or outer face of the disk 10. Freely mounted on the sleeve 35 at a point adjacent to the flange 37 is a plate 38, said plate 38 and flange 37 having interposed therethrough an annular disk 39 of hardened steel or kindred material and which also freely surrounds the hub 9. This disk 39 provides an effective clutching action between the member 38 and the flange 37 of the hub 9 when driving in high or direct speed, such clutching action being effective in a manner to be hereinafter described.

Keyed or otherwise fixed to the outer or free end portion of the member 35 is a disk 40, to the peripherial marginal portion of which is applied an annular facing 41 of suitable material adapted to have direct contact with the portion 4' of the head 4 hereinbefore referred to whereby the member 35 and the parts associated therewith will be held against rotation around the shaft 11 when it is desired to effect a reduced speed of the driven member.

The disk 40 is provided with a rearwardly disposed hub 42 and interposed between this hub 42 and the member 38 is a thrust bearing assembly 43. The periphery of the hub 42 as herein disclosed is provided with a rabbet 44 which in connection with the applied assembly 43 provides an annular groove or channel extending circumferentially around the hub 42 and in which is engaged an operating yoke 45. As particularly illustrated in Figure 8, this yoke 45 when in applied position is substantially in the form of an inverted U and has its side members provided with the oppositely disposed and alined trunnions 46 to which operatively engage the rock arms 47 carried by the shaft 48. This shaft 48 is disposed transversely through the housing H and is adapted to be rocked or operated at will in any desired manner as by a hand lever, pedals or other means convenient to the operator. Upon rocking the shaft 48 in one direction the disk 40 will be brought into braking engagement with the portion 4' of the head 4 and vice versa. The advantages of this operation will hereinafter be set forth.

The member 38 at diametrically opposed parts is provided with the outstanding radial arms 49 with which are snugly engaged the outer or free extremities of the rods 50 which are fixedly secured to the plate 21 and disposed through the slots 34.

The member 38 is provided with the opposed outstanding radial arms 51 herein disclosed as in quarter relation with respect to the arms 49, each of said arms 51 being provided with a rearwardly disposed boxing 52. Freely extending through each of the boxings 52 is the forward threaded end portion of an elongated shank 53, the inserted end portion of which has a head or lug 54 threaded thereon. Interposed between this lug 54 and the rear end of the boxing 53 is an expansible member 55 herein disclosed as a coiled spring of requisite tension encircling the shank 53. Each of the shanks 53 is also directed through a slot 34' and through a sleeve 56 which is snugly disposed through an arm 33 and directed through a slot 34', said sleeve having its outer end provided with a head 57 in direct contact with the plate and riveted or otherwise fixedly secured thereto. Each extremity of the sleeve 56 is provided with a pair of duplicate spiral cams 58, the cams at one end of the sleeve being reversely related with respect to those at the opposite end. The shank 53 disposed through the sleeve 56 fixedly carries the circumferentially disposed cam members 59 similar to the adjacent sleeves and said cams 58 and 56 are constantly maintained in contact so that upon rotation of the shank 53 in one direction, said shank 53 will be caused to move forwardly.

Keyed or otherwise fixed to the portion of the shank 53 rearwardly of the plate 21 is a rock arm 60, the shank 53 being disposed through an opening 61 suitably provided in the arm 60. The arm 60 adjacent to the opening 61 is provided with a pair of spiral cams 62 complemental to the adjacent cams 58 of the sleeve 56 and also said cams 62 and 58 being constantly in contact. Upon the movement of the shank 53 in the opposite direction these coacting cams 58 and 62 cause a rearward endwise movement of the shank 53.

The outer end portion of the arm 60 is enlarged to provide a weighted member 63 and said weighted member or portion 63 is adapted to have secured thereto one or more plates 64 whereby the weight at the outer end of the arm 60 may be regulated as the requirements of practice may require. The arm 60 adjacent to the shank 53 is provided with the inwardly directed bill 65 provided with a slot 66 through which is directed an outstanding pin 67 carried by the disk 19 and which pin is also disposed through the arcuate slot 66' suitably provided through the plate 21.

Threaded upon the rear end portion of the shank 53 is a nut 68 which has contact with the adjacent portion of the arm 60 so that it holds the said arm against outward movement and also permits said arm to be adjusted lengthwise of the shank 53 to assure the requisite relation of the cams 58, 59 and the cams 62 and 50.

The shank 53 also has threaded thereon a nut 69 having direct contact with the rear end of the boxing 52 and said shank also has threaded thereon a lock nut 70 for coaction with the nut 69. The nut 69 contacts with the boxing 52 upon forward movement of the shank 53 to bring the disk 40 and the portion 4' of the head 4 into braking engagement.

Upon proper adjustment of the nut 69, the forward movement of the shank 53 regulates the extent of forward movement of the disk 40. It will be understood that an initial adjustment of the nut 69 is effected when the mechanism is placed in service, but upon wearing of the strip 41 in the coacting face of the portion 4', the said nut 69 may be further adjusted to compensate for such wear.

As illustrated in Figure 10, I disclose an embodiment of my invention wherein instead of employing the nut 69, I provide an automatic means for taking up the wear of the coacting faces of the member 41 and the portion 4' and which consists of an expansible coiled spring 72 encircling the shank 53 and interposed between and bearing against the boxing 52 and the forward end of the cam members 59.

To prevent the weighted end portion of each of the arms 60 having undue outward swinging movement under centrifugal action, I find it of advantage to provide the plate 21 with an outstanding stop lug 71 having coaction with such arm.

Normally or with the drive shaft or member inactive, the weighted end portions of the arm 60 are at their innermost positions with the pin 67. The braking disk 40 or more particularly the member 41 carried thereby is in braking engagement while the plate 21 and the disk 19 are in released position it also being understood that at this time the member 39 is in released position with respect to the flange 37 of the sleeve 35. In this relation, the driven element will be caused to rotate at a reduced speed in accordance with the ratio of the pinion 17 and the gears 28 and 19. As the shaft 11 is rotated and the speed of such rotation increases the weighted end portions of the arms 60 under centrifugal action will swing outwardly resulting in the bills 63 imparting movement to the pins 67 and consequently gives a partially independent rotation to the disk 19, the length of the slots 66 being sufficient to permit the requisite rotation of the shanks 53 to result in the engagement of the cams 58 and 60 effecting sufficient rearward movement to the shanks 53 to move the disk 40 and the member 41 carried thereby out of braking engagement with the portion 4' of the head 4 and at the same time bring the plate 21 and the disk 19 into clutching engagement. This also brings the member 38 and the flange 37 in clutching engagement whereby the driven member will be rotated in a high speed or direct from the shaft 11. This clutching engagement between the member 38 and the flange 37 is effected through the medium of springs 55.

With the driven element in high it is believed to be clearly understood from the foregoing that upon reduction of the speed of the shaft 11, the foregoing operation will be reversed. It is to be particularly stated at this time that the clutching engagement between the plate 21 and the disk 19 is such as to not require entire dependence upon the centrifugal action of the arm 60 to maintain such clutching engagement when the mechanism is traveling in high speed or as a unit.

When my improved mechanism is employed in connection with a motor driven vehicle and such vehicle may be traveling down grade and it is desired, as is the general practice, to use the motor as a braking medium, it is only necessary that the shaft 48 be rocked in the requisite direction to cause the yoke 45 to bring the disk 40 and the head 4 into braking engagement and which adjustment is readily permitted by the expansible members or springs 55. It is also to be particularly noted that this operation can be accomplished irrespective of the speed at which either the drive or driven member may be rotating at the time it is desired to be advisable to make such adjustment.

It is to be particularly noted that the gear assembly is disposed within the rear portion of the housing H and this is of particular advantage especially in going up grade as it assures an effective lubrication of such assembly by the oil within the housing.

The pins 67, which are rigidly secured to the disk 19, have contact through the slotted bill 65 with the centrifugally and torque operated members 60 carried by the plate 21. All the torque offered by the operation of the present mechanism is carried by the pins 67 disposed through the slots 66' in the plate 21 and against the slotted bills 65 of the arms 60. The members or arms 60 are at their outward position as a result of the centrifugal force with the disks 21 and 19 in clutching contact so that the pins 67 in order to overcome the centrifugal force of the arms 60 have to slip the disks 21 and 19. When these disks are rotating at a high speed the clutching energy of such disks 19 and 21 and the centrifugal force of the arms 60 are much greater than if running at a lower speed so that it is obvious that when ascending an incline or pulling in mud or other hard pull which would cause the speed to slow down, both the clutching and centrifugal energies are lessened, thus increasing the torque and which torque is borne by the pins 67 and the bills 65. Under this torque strain it is obvious that the only thing that can occur is for the pins 67 to move to the opposite ends of the slots 66' in the disk 21 and at which time the arms 60 will be retracted to their inward and released position. The arms 60 will maintain this position while under said torque strain and until centrifugal force again carries said arms back to their outward position as hereinbefore referred to and at which time the device will again be rotating as a unit.

From the foregoing description it is thought to be obvious that a power transmission mechanism constructed in accordance with my invention is particularly well adapted for use by reason of the convenience and facility with which it may be assembled and operated, and it will also be obvious that my invention is susceptible of some change and modication without departing from the principles and spirit thereof and for this reason I do not wish to be understood as limiting myself to the precise arrangement and formation of the several parts herein shown in carrying out my invention in practice except as hereinafter claimed.

I claim:—

1. A transmission mechanism comprising, in combination, a drive element, a driven element, a member free to rotate with respect to the drive and driven elements, a gear assembly associated with the drive element and the member, to rotate the driven element at a reduction when said member is held against rotation, an automatic clutch operable under centrifugal action to cause said member and the driven element to have direct rotation, a braking means for said member, and an operative connection between the braking means and the clutch, shifting the braking means to inoperative position when the clutching means is operative, said means for operating the clutch also operating under torque to release the clutching means and to apply the braking means.

2. A transmission mechanism comprising, in combination, a drive element, a driven element, a member free to rotate with respect to the drive and driven elements, a gear assembly associated with the drive element and the member, to rotate the driven element at a reduction when said member is held against rotation, an automatic clutch operable under centrifugal action to cause said member and the driven element to have direct rotation, a braking means for said member, and an operative connection between the braking means and the clutch, shifting the braking means to inoperative position when the clutching means is operative, said means for operating the clutch also operating under torque to release the clutching means and to apply the braking means, and means operable independently of the automatic means for applying the braking means and releasing the clutching means.

3. A transmission mechanism comprising, in combination, a drive element, a driven element, a member free to rotate with respect to the drive and driven elements, a gear assembly associated with the drive element and the member, to rotate the driven element at a reduction when said member is held against rotation, an automatic clutch operable under centrifugal action to cause said member and the driven element to have direct rotation, a braking means for said member, and an operative connection between the braking means and the clutch, shifting the braking means to inoperative position when the clutching means is operative, said means for operating the clutch also operating under torque to release the clutching means and to apply the braking means and a housing for the mechanism, a wall of the housing constituting an element of the braking means.

4. A transmission mechanism comprising, in combination, a drive element, a driven element, a disk freely mounted on the drive element, a driven element free to rotate with respect to the drive element, a braking means including a brake element carried by the disk and having movement axially thereof, said brake element when moved in one direction being set and being in release when moved in the opposite direction, a driven member supported for movement toward or from the disk and adapted to have clutching engagement with the disk, a gear assembly operatively connecting the disk, drive shaft and member, said assembly permitting the driven element to rotate in reduction when the axially movable brake element is set and the driven element is free of the disk, and means operating under control of centrifugal force for bringing the driven element into engagement with the disk and into release, and an operative connection between said means and the driven member operating under torque to release the driven member from the disk and to set the axially movable brake element.

5. A transmission mechanism comprising, in combination, a drive shaft, a driven element, a disk freely mounted on the drive shaft, a rotatable driven element movable into or out of clutching engagement with respect to the disk, a braking means including an element carried by the disk and having movement axially therof, said element when moved in one direction being set and being in release when moved in the opposite direction, a member freely supported by the disk, a second member supported by the braking element, shanks disposed through the driven member and said last named member, coacting cam members carried by the shank and the driven member whereby rotation of the shanks in one direction releases the axial shifting of the brake element and brings the driven member into clutching action with the disk, reverse rocking movement of the shanks setting said braking element and releasing the driven member, means operable under centrifugal force imparting the first named rotation to the shanks, said means under torque imparting the second movement to the shanks, and automatic means operating when the shanks are turned under centrifugal force to bring the axially movable brake element into clutching engagement with the disk.

6. A transmission mechanism comprising, in combination, a drive shaft, a driven element, a disk freely mounted on the drive shaft, a rotatable driven element movable into or out of clutching engagement with respect to the disk, a braking means including an element carried by the disk and having movement axially thereof, said element when moved in one direction being set and being in release when moved in the opposite direction, a member freely supported by the disk, a second member supported by the braking element, shanks disposed through the driven member and said last named member, coacting cam members carried by the shank and the driven member whereby rotation of the shanks in one direction releases the axial shifting of the brake element and brings the driven member into clutching action with the disk, reverse rocking movement of the shank setting said braking element and releasing the driven member, means operable under centrifugal force imparting the first named rotation to the shanks, said means under torque imparting the second movement to the shanks, and automatic means operating when the shanks are turned under centrifugal force to bring the axially movable braking element into clutching engagement with the disk, and a plate supported by the driven member through which the shanks are also directed, the driven element having slots through which the shanks are disposed, said slots permitting the driven member to have rotation independent of the plate during the initial action of the centrifugal means or under torque.

7. A transmission mechanism comprising, in combination, a drive shaft, a driven element, a disk freely mounted on the drive shaft, a rotatable driven element movable into or out of clutching engagement with respect to the disk, a braking means including an element carried by the disk and having movement axially thereof, said element when moved in one direction being set and being in release when moved in the opposite direction, a member freely supported by the disk, a second member supported by the braking element, shanks disposed through the driven member and said last named member, coacting cam members carried by the shank and the driven member whereby rotation of the shanks in one direction releases the axial shifting of the brake element and brings the driven member into clutching action with the disk, reverse rocking movement of the shanks setting said braking element and releasing the driven member, means operable under centrifugal force imparting the first named rotation to the shanks, said means under torque imparting the second movement to the shanks, and automatic means operating when the shanks are turned under centrifugal force to bring the axially movable brake element into clutching engagement with the disk, and a plate supported by the driven member through which shanks are also directed, the driven element having slots through which the shanks are disposed, the said slots permitting the driven member to have rotation independent of the plate during the initial action of the centrifugal means or under torque, said plate being provided with operable slots, pins carried by the driven element and extending through said slots in the plates, and bills carried by the shanks operatively engaged with said pins.

In testimony whereof I hereunto affix my signature.

WILLIAM I. WHEELER.